Patented Mar. 18, 1941

2,235,098

UNITED STATES PATENT OFFICE 2,235,098

ALIPHATIC SULPHATES AND METHOD OF MAKING SAME

Robert Louis Brandt and John Ross, New York, N. Y., assignors to Colgate-Palmolive-Peet Company, Jersey City, N. J., a corporation of Delaware No Drawing. Application April 1, 1939, Serial No. 265,586

21 Claims. (Cl. 260—458)

This invention relates to an improved process of sulphation and particularly to a method for preparing relatively pure, uniform, sulphated, wetting, deterging, emulsifying and like agents by sulphation of aliphatic oxy compounds in a solvent comprising liquid sulphur dioxide and another solvent. This invention is also directed to the preparation of new products by the reaction of 1-2 aliphatic oxirane compounds (1-2 aliphatic cyclic inner ethers) having at least 6 carbon atoms with a sulphonating agent.

It has been proposed in the preparation of sulphonated organic materials to conduct the sulphonation step while the organic material or the sulphonating agent is in solution in a solvent. These processes have effected desirable results in that the side reactions have been reduced and the degree of reaction has been controlled to some extent. However, these processes have had many limitations in that a solvent for the sulphonating agent is, generally speaking, not a good solvent for the materials to be sulphonated. On the other hand, good solvents for the material to be sulphonated are usually non-solvents for sulphonating agents, or react therewith, thus making their use prohibitive. Solvents for each of the separate ingredients have not been combined since many of such solvents are not miscible with each other. The solvent found most desirable for dissolving sulphonating agents, namely liquid sulphur dioxide, is not compatible with certain members of the broad class of materials which are sulphonated to prepare wetting, deterging, solubilizing and emulsifying agents, nor is it compatible with a great many of the better solvents for these materials, such as petroleum ether.

Among the many classes of organic sulphonates it has been found that high molecular weight aliphatic sulphuric acid salts are especially desirable for many purposes because of their unusually high wetting, washing, penetrating, solubilizing, and emulsifying efficiency, but compounds of this type have not been satisfactorily prepared in solution.

The preferred aliphatic compounds used to prepare these sulphates, as well as the resulting sulphates, are high molecular weight compounds containing at least six carbon atoms, and hence, if a solvent is not used, it is sometimes difficult to cause the raw materials to react to obtain maximum yields of uniform products. If heat is used to speed the reaction, some increase of reactivity is observed, but many side reactions also may occur, and impure, non-uniform products of inferior color and odor may result. Polymerization, oxidation, charring, decomposition, improper substitution, true sulphonation, and other difficultly controllable and generally undesirable side reactions may take place. The viscosity or plasticity of the reaction mass is sometimes high and hence mixing is difficult. Often special equipment is necessary and a great amount of energy is required to effect mixing, thus raising the cost of manufacture. Improper mixing results in localized over-heating and over-reaction in various parts of the reaction mass and substantially no change in others. Cooling, direct or indirect, is likewise not effective if the viscosity of the mass is high. Furthermore, if it is desired to sulphate the higher molecular weight aliphatic compound alone or with other ingredients in solution, the preferred solvent for sulphonation, liquid sulphur dioxide, while dissolving the stronger sulphonating agent does not dissolve these aliphatic oxy constituents to a great extent, and the reaction mass is in two phases with consequent non-uniformity of products of inferior grade. In addition, some of the sulphonation products are incompatible with the reacting mixture and the solvents normally used, and hence quite often another phase is produced. The formation of materials of inferior quality as to color, odor, purity, uniformity, and general appearance together with decreased efficiency result from prior art methods of sulphation in solution.

It has now been discovered that it is possible to prepare uniform aliphatic sulphates of unusually good color, odor, purity, and other desirable properties on a commercial and economical basis by conducting the sulphation reaction in a solvent mixture comprising liquid sulphur dioxide and another relatively low-boiling inert solvent.

It has also been found that sulphation of the various aliphatic hydroxy compounds can be conducted in a single phase with exact control of temperature and of the type and degree of reaction. Agitation is facilitated by reason of the low viscosity of the reacting mass attainable with the present invention. By employing the present invention, the products of reaction in many cases remain in solution in the reacting mass. The products are more uniform, of better color and odor, and have wetting, foaming, deterging, and emulsifying properties far superior to materials prepared by an identical process without the use of the novel solvent combination.

An important feature of this invention is to employ a solvent combination, including liquid sulphur dioxide, which combination is miscible with the aliphatic oxy material to be sulphated and the sulphating agent. The substances with which the liquid sulphur dioxide is combined in forming the novel sulphation solvent combination include saturated cyclic and acyclic hydrocarbons and halogen derivatives thereof having a boiling point not higher than about 120° C.; dioxane; solid carbon dioxide; benzene and other aromatic hydrocarbons; carbon disulphide; diethyl ether and other ethers; ethylene and other olefines; and various combinations thereof.

One of the unusual features of the present invention is the fact that, although a number of the above materials are not compatible with the liquid sulphur dioxide by themselves, if a material to be sulphated and/or a sulphating agent are present, the resulting mixture is miscible in the proportions especially desirable for sulphating. To illustrate this point: Liquid sulphur dioxide is immiscible with a petroleum ether and will not dissolve long straight-chain alcohols such as dodecanol. Furthermore, a petroleum ether will not dissolve a sulphonating agent such as 20% oleum or sulphur trioxide. However, if these substances are mixed in the volumetric proportions of about 1 part liquid sulphur dioxide, 1 part petroleum ether, 1 part dodecanol, and 1 part of 20% oleum, a uniform solution results and the sulphation proceeds smoothly.

Liquid sulphur dioxide in such solvent compositions serves several functions in the preparation of these substances which functions are not obtainable with any other organic or inorganic liquid.

Liquid sulphur dioxide is a more universal solvent for the reactants and products in reactions of this type. It is a very good solvent for sulphating agents without materially altering their identity or operation. Other solvents such as short-chain olefinic compounds, which do dissolve a sulphating agent such as sulphur trioxide, react with a substantial proportion of the agent to change its identity, for example forming carbyl sulphates. Furthermore, if the selected liquid does dissolve the sulphonating agent, it often does not dissolve the materials to be treated. On the other hand, a solvent for the organic constituents is generally not a solvent for the sulphonating agent or it reacts therewith. If the solvent does not hold all the constituents in solution during the reaction, a two-phase mixture would occur with possible resulting non-uniformity of product.

Liquid sulphur dioxide, because of it low boiling point, is very effective as a refrigerant. A portion of the liquid may be evaporated to absorb the heat of vaporization thereof from the reaction mixture and thus effectively refrigerate it. The normal boiling point of this solvent is nearer to the optimum reaction temperature than most of the generally used organic liquids, and its low freezing point is also of value in working at subatmospheric temperatures.

Another feature of liquid sulphur dioxide which is of major importance is the fact that it affects the rate of reaction of the various constituents. It has been reported in the literature that liquid sulphur dioxide appears to form loose addition products with certain reagents. This property of solvolysis in all probability alters the relative reactivity of the reagents and is apparently unique for this purpose.

The low boiling point of the liquid sulphur dioxide renders it a relatively simple matter to remove the excess solvent from the final product.

Another feature of the present solvent combination containing liquid sulphur dioxide is that a single phase reaction takes place.

Furthermore, since a solution can be formed, the viscosity of the mass may be substantially reduced so that a high degree of turbulence may be imparted to the solution, thus easily effecting either direct or indirect temperature control.

The liquid sulphur dioxide serves another novel purpose by reason of the fact that it has a low solubility in dilute sulphuric acid. The reaction mass containing the excess liquid sulphur dioxide may be diluted with water to stop the reaction and to cause the mixture to separate into several layers; in the case of two layers, one comprises the aqueous layer of sulphuric acid and organic derivatives thereof, and the other comprises the liquid sulphur dioxide and water-insoluble organic compounds. By control of the amount of water added, even three layers may be formed: a lower layer of dilute sulphuric acid, a middle layer of organic and inorganic sulphuric acids, and an upper layer of a solution of liquid sulphur dioxide and unreacted organic compounds. Without the liquid sulphur dioxide present there is a tendency to emulsify the water-insoluble products into the aqueous layer.

Liquid sulphur dioxide is chemically stable and noninflammable, and has highly desirable thermal and heat transfer properties. These properties add to general ease of handling at low temperatures and give it advantages over all previously employed solvents.

The materials which can be sulphated by the present process include long-chain saturated and unsaturated primary, secondary, and/or tertiary aliphatic mono- or polyhydric alcohols and epoxy compounds, having cyclic, straight or branched chains and the halogen and/or other derivatives thereof; long alkyl chain ethers and esters of polyhydric alcohols partially esterfied and/or etherified, such as monoglycerides, sorbitol distearate; hydroxy fatty acids and their esters such as castor oil, either alone or with unsaturated aliphatic substances such as long-chain olefines; aromatic compounds and the like.

One or more long-chain mono- or polyhydric alcohols and potentially polyhydric alcohols (branched or straight-chain) including hexyl, heptyl, octyl, nonyl, decyl, dodecyl, myristyl, tetradecyl, cetyl, octadecyl, octadecenyl, montanyl, carnaubyl, octadecandiol, ceryl, cyclohexyl, methyl cyclohexyl, methyl tetrahydrofurfuryl, and melissyl alcohols, and mixtures containing these alcohols such as those prepared by hydrogenating coconut oil, cocoa butter, soy bean oil, tallow, cottonseed oil, olive oil, castor oil, palm oil, fish oil, whale oil, tall oil, carnauba wax, beeswax, Japan wax, Chinese wax, montan wax, spermaceti, heptadecanone, stearone, laurone, and the like may be used.

The potentially polyhydric alcohols include alkyl substituted ethylene oxide or oxiranes, e. g., cetene oxide 1,2, decyl oxirane, 9,10 epoxyoctadecane, heptadecene oxide 7,8, heptene oxide 3,4, dodecyl-tetrahydrofurfuryl alcohol, and other alkyl substituted tetrahydrofurfuryl alcohols or other derivatives such as those mentioned in the Russell et al application Serial No. 255,854, filed February 11, 1939. The preferred material of this class of polyhydric alcohol anhydrides are those having the oxirane linkage since the resulting products have the hydrophilic groups adjacent to each other and the properties thereof are far superior to those compounds having one sulphate radical as the only hydrophilic grouping. The wetting, washing, and emulsifying properties of the new materials are substantially superior to those of simple sulphated material old in the art, and they show little tendency to dust or produce fines, a great weakness of the present unsubstituted long-chain alkyl primary monosulphates. The preferred compounds may be prepared from olefines formed by dehydrating the fatty alcohols or long-chain secondary alcohols from fatty acids, or other sources of olefines, such as petroleum, cracked mineral oil, and extracts thereof. These olefines, such as dodecene 1,2 from lauryl alcohol, octadecandiene from castor oil by hydrogenation and dehydration, oleyl alcohol by hydrogenation of oleic acid or olive oil, dehydrated oleyl alcohol, hexadecene 1,2 from palmitic acid or palm oil, pentadecene 7,8 by dehydration of pentadecanol formed from calcium caprylate, are partially oxidized under suitable conditions to prepare the alkyl oxirane products. They may also be prepared from glycols or chlorhydrins. If these oxirane compounds are treated with the sulphating agent listed hereinafter, e. g. chlorsulphonic acid, acetyl sulphonic acid, etc., the products formed may include not only sulphate radicals but may also have hydroxy, chloro, bromo, acetyl, etc. groups.

Among other substituted oxy aliphatic compounds which may be used are the chlorhydrins such as those described in U. S. Patent No. 2,139,669; the oxy-fatty acids and the esters thereof such as ricinoleic acid, ethyl ricinoleate, castor oil, dodecyl alcohol ester of hydroxy acetic acid, cetyl glycerate, gluconic and mannonic acids and their esters, ethyl ester of 9,10 epoxy-octadecanoic acid; partial ethers and esters of polyhydric alcohols or potential polyhydric alcohols, such as monolauroyl glycerine, tetraethylene glycol, ketonic compounds such as acetone alcohols; and the like.

Polyhydric alcohols or potential polyhydric alcohols mentioned above include glycerine, polyglycerine, beta-methyl glycol, glycidol, beta-methyl glycidol, glycols, polyglycols, sorbitol, mannitol, arabitol, erythritol, glyceric acid, pentan-diol, pentan-triol, tetrahydrofurfuryl alcohol, octodecandiol. Esters and ethers of these alcohols may be prepared from the following acids or esters or derivatives thereof: abietic acid, benzoic acid, stearic acid, palmitic acid, oleic acid, lauric acid, myristic acid, capric acid, caproic acid, caprylic acid, naphthenic acid, hydrogenated abietic acid, cerotic acid, acids from oxidized mineral oil, chloropalmitic acid, chlorostearic acid and other mono- and poly-halogenated fatty acids, ricinoleic acid, behenic acid, melissic acid, the corresponding acid halides or halogen chain substituted derivatives thereof; castor oil, tallow, palm oil, olive oil, cottonseed oil, soy bean oil, coconut oil, fish oil, whale oil, tall oil, cocoa butter, carnauba wax, beeswax, Japan wax, Chinese wax, montan wax, spermaceti; and any of the alcohols listed hereinbefore. The polyhydric alcohol partial ethers and/or esters may be prepared by reacting polyhydric alcohol in solvents comprising liquid sulphur dioxide with the alcohols, esters, and acids or derivatives thereof listed above. These materials include those described in Harris Reissue Patent 20,636; Harris Patent No. 2,023,387; Muncie Patents Nos. 2,127,567; 2,130,361; 2,130,362; and Russell et al application Serial No. 255,854 of February 11, 1939, as well as Patents Nos. 2,044,399 and 2,044,400 granted to Rheiner et al., and Patent No. 1,897,741 issued to Ulrich et al. The various individual reactions and products disclosed in these patents or applications may be variously performed or produced while the materials are dissolved in the novel solvent combination of the present invention to effect improved sulphate products. In preparing these products mono- or polysulphates and mono- and polyesters and/or ethers may be prepared, depending on the number of replaceable hydroxy or potential hydroxy groups and the properties of the product desired. It is also possible to similarly treat the corresponding sulphur compounds, e. g., the thio-oxiranes and aliphatic mercaptans, by suitable adjustment of the solvent and the like.

As emphasized hereinbefore the sulphation is preferably conducted in a mixture of solvents to improve the solubility of the organic constituents. Among such solvents, in addition to liquid sulphur dioxide, are benzol, methane, ethane, pentane, butane, propane, ethylene, petroleum ether; dioxane; diethyl ether, dichloroethyl ether; carbon disulphide, carbon dioxide; carbon tetrachloride, chloroform, dichlorethane, perchlorethylene, trichlorethylene, dichlorethylene, dichlordifluormethane (Freon) and other halogenated hydrocarbons; and various mixtures thereof.

The order of introducing the agents may be varied more or less. For example, the sulphating agent or solution thereof may be added to a solution of the aliphatic compounds. On the other hand, the aliphatic compound, per se or in solution, may be added to a solution of the sulphating agent. Solutions of both may also be simultaneously brought into confluence, which is advantageous in a continuous process.

Cooling of the reaction mixture may be obtained by evaporating a portion but not all of the solvent employed. By suitable selection of the proper solvent combination, pressure control, and the like, it is possible to obtain practically any desired temperature. In addition, refrigerating may be obtained by indirect cooling or by means of other inert refrigerants such as non-gaseous carbon dioxide added directly to the reacting mixture. These refrigerants may be separated and recovered by fractional distillation and compression.

The polyhydric alcohol partial ethers or esters may be sulphated simultaneously with their formation, or subsequently, either directly or after previous elimination of excess reactants or of impurities.

The sulphation treatment is conducted while the materials are substantially in solution in a solvent comprising liquid sulphur dioxide and another solvent by means of concentrated sulphuric acid, fuming sulphuric acid, oleum, sulphonyl chloride, sulphur dioxide and chlorine gas, sulphur trioxide, acetyl sulphuric acid, glyceryl sulphuric acid, bromsulphonic acid, chlorsulphonic acid, or their mixtures, with or without sulphation assistants, as for example, agents capable of combining with water, such as acetic anhydride, glacial acetic acid, acetyl chloride, propionic anhydride, butyric anhydride, phosphorus pentoxide, phosphoric oxychloride, boric acid, boric anhydride, and the like. Liquid sulphur dioxide and the other solvents such as dioxane may be added to the sulphating agent before the reaction. The temperature used varies within wide limits preferably between —15° C.

and +15° C. depending on the strength of the sulphating agents, the solvent combination employed, and the nature of the aliphatic material to be sulphated. It is possible to introduce one or more sulphuric acid groups depending on the desired properties of the final products.

The sulphation reaction may be stopped by the addition of water to the reaction mass, thus reducing the acid concentration. This addition of water generates heat which may be used to advantage in removing the liquid sulphur dioxide or other solvent. On the other hand, the addition of water may be made under suitable conditions of cooling and/or pressure so that the liquid sulphur dioxide is not vaporized and two or three immiscible layers are formed—depending on the degree of dilution with water. The aqueous layers will contain sulphuric acid or derivatives thereof, and the upper or liquid sulphur dioxide layer will contain the non-sulphated material. In a two-layer system the organic sulphuric acids will be in the aqueous layer, whereas in the three-layer system the organic sulphuric acids will be in an intermediate layer. These layers may be separated and the liquid sulphur dioxide solution separated into its constituents or re-used in the sulphation step. The aqueous solution of organic and inorganic sulphuric acids from either source of separation may be extracted with a relatively concentrated solution of sodium chloride also containing sodium acid sulphate. This step removes a substantial proportion of the excess sulphuric acid from the organic sulphuric acids. The organic sulphuric acids, with or without the excess sulphuric acid, may be neutralized with organic or inorganic bases, as for example soda ash, caustic soda, caustic potash, ammonia, methyl amines, ethyl amines, butyl amines, mono-, di-, or tri-ethanolamine, mono-, di-, or tri-glycerol amine, pyridine, piperidine, nicotine, lime, and the like. Other salts which may be formed include those of magnesium, mercury, lithium, and so on. It is also possible to prepare inorganic salt free material by preparing the calcium salt, thus causing a precipitation of a substantial portion of the sulphuric acid as insoluble calcium sulphate which may be separated from the soluble calcium salt of the organic sulphonic acids.

Another way for preparing the inorganic salt free material is to extract the solid salts or aqueous solutions of mixtures of the soluble salts with a solvent such as ethyl alcohol, dioxane, acetone, Cellosolve, butyl alcohol, and the like. The individual salts may be prepared by salt interchange between concentrated solutions of soluble inorganic salts of the cation desired with solutions of the organic sulphonic acid salts on hand.

The following examples are given for the purpose of illustrating the present invention, but are not intended to be limiting on the scope thereof.

*Example I*

173 parts by weight of dodecyl alcohol are mixed while stirring with three volumes of liquid sulphur dioxide and one and a half volumes of dichlorethane, and the uniform mixture is reacted at −10° C. with 117 parts by weight of chlorsulphonic acid in small increments. The reaction is stopped after 1 hour by diluting the reaction mass with cold water. The liquid sulphur dioxide is removed by gentle heat and stirring. The immiscible layer of dichlorethane and non-sulphonated organic material is separated from the aqueous solution of sulphuric acids. After further washing with dichlorethane the aqueous layer is neutralized with sodium hydroxide and extracted with ethyl alcohol to obtain a solution of inorganic salt free product, which is then dried.

*Example II*

The mixed monoglycerides of coconut oil fatty acids in the proportion of about 145 parts by weight are mixed in an autoclave with three volumes of a solvent combination comprising two parts by volume of liquid sulphur dioxide and one part ethylene dichloride. 117 parts by weight of chlorsulphonic acid are then slowly added to the monoglyceride solution. The reaction is permitted to run for about one hour, after which the material is diluted with ice-water, and the immiscible solvent layer is separated from the aqueous solution of acids. The acid solution is neutralized with lime, filtered free of calcium sulphate, and dried to yield a light-colored mixture of monoglyceride monosulphates.

*Example III*

85 parts of dodecyl oxide 1,2, prepared by limited oxidation of dodecene, are dissolved in four volumes of a solvent mixture comprising two parts by volume of sulphur dioxide and one part by volume of dichlorethane, held in an autoclave. 60 parts by weight of chlorsulphonic acid are then slowly added. The mixture is permitted to react for about one and a half hours and is then diluted with water. The solvent layer is withdrawn from the aqueous solution of organic and inorganic acids. The mixture is extracted with an aqueous solution of Glauber's salts and then neutralized with ammonia.

*Example IV*

350 parts by weight of the fatty alcohols obtained from coconut oil by hydrogenation are dissolved in 4½ times their volume of a solvent mixture comprising two parts liquid sulphur dioxide and one part of petroleum ether. To this mixture is then added 200 parts by weight of 20% oleum dissolved in two parts by volume of liquid sulphur dioxide. The reaction is stopped after about one hour by dilution with ice-water. The solvent layer is withdrawn and the product neutralized with sodium hydroxide.

The above examples merely show a few of the specific embodiments of the broad invention given in detail hereinbefore.

The products obtained in accordance with the present invention either as acids or salts have good wetting, solubilizing, deterging, sudsing, water-softening, dispersing, emulsifying, penetrating, and equalizing properties. Since their calcium and magnesium salts are water-soluble, they operate efficiently in hard as well as in soft water. They are good wetting agents both in hot and cold baths, and function effectively in the presence of large quantities of inorganic salts.

Although the new materials possess unusual deterging, sudsing, and water-softening properties by themselves, their action may be augmented by the addition of any of the common auxiliary agents used in soap and detergent compositions. Suitable addition agents are other emulsifying agents including soaps, rosinates, alkylated aromatic sulphonic acid salts, sulphonated mineral oil extracts, Turkey red oil, lecithin, glycerolamines, diethanolamine, and triethanolamine and their soaps; alkaline soap builders such as sodium carbonate, sodium silicate, sodium phosphate and borax; coloring matter such as dyes, lakes, pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, glycol, tetrahydrofurfuryl alcohol, phenol, cyclohexanol, water, tetralin, hexalin, pine oil, mineral oil, mineral oil extracts, and naphtha; perfumes and deodorants; fats, oils, fatty acids, monoglycerides, vitamins, waxes, gums, glues, or resins; germicides such as phenol, mercury chloride, phenyl mercury nitrate, phenyl mercury chloride, methyl ester of hydroxy benzoic acid, and mercuric chloride; styptics such as aluminum chloride and cephalin; any of the common water-soluble salts such as sodium sulphate, chloride, acetate, bicarbonate, sesquicarbonate, hypochlorite, thiosulphate, hydrosulphite, and hyposulphate, or the corresponding ammonium and potassium salts thereof. The type of addition agent to be used, of course, will depend on the ultimate use of the new composition.

The water-soluble, water-softening phosphorus compounds of the type of tetraphosphoric, pyrophosphoric or polymetaphosphoric acids and their alkali metal, ammonia, and amine salts or alkyl esters may also be added to these compositions.

The final composition with or without one or more addition agent may be formed into beads, flakes, bars, chips, crystals, powders, solutions, liquid or plastic emulsions, pastes, creams, salves, or any other forms desired. The ingredients may be mixed by any of the common methods such as grinding, stirring, kneading, crutching, and fusing. Drying of the mixed solutions may be effected by means of rolls, spraying or otherwise.

Although the specific examples given hereinbefore indicate a batch procedure, it is possible to conduct the entire process in a continuous manner. For example, the aliphatic compounds may be mixed with the solvent mixture and then brought into confluence with a liquid sulphur dioxide solution of a sulphuric acid derivative, meanwhile continuously flowing the materials through heat-exchangers. At several points in the flow additional sulphuric acid derivative solution may be added to complete sulphation of the material. Water may be added and sulphur dioxide removed by heat and release of pressure. The neutralization may be conducted by continuously bringing solutions of the acid or acids into confluence with concentrated alkali. The various washing steps indicated hereinbefore may be conducted by countercurrent flow through suitable towers at the appropriate point or points in the process. Addition agents, preferably in the form of their solutions, may be continuously introduced into the sulphate solution either before, during, or after the neutralization.

The compositions may be used in various ways such as washing compositions for wood, metal, stone, glass, brick, masonry, and painted surfaces; insecticides; cements; abrasive compositions; antiseptics; water-softeners; deodorants; disinfectants; water paints and polishes; sizes, glues and adhesives such as shellac and casein compositions; liquid, solid and paste tooth and mouth detergents; laundry detergents and other textile agents including laundry blueing, bleaching, dyeing, softening, lubricating, and discharging compositions; depilatories; dust preventing compositions; fire extinguishing compositions; drain, lavatory and radiator cleaners; antifreezing, anti-fogging, and anti-corrosion compositions; wood impregnants; electrolytic baths; etching compositions; cosmetics, shaving preparations, shampoos and hair wave lotions; tanning agents and fat-liquors for leather; photographic solutions; paint, stain and grease removers; dry-cleaning compositions; rug cleaners; petroleum de-emulsifying compositions; fruit washing; fat splitting; preparation of dyes and dye intermediates; preparation of germicidal agents; preparation of resins and plasticizers and any compositions requiring wetting, washing, emulsifying, penetrating, solubilizing, dispersing and like agents.

As many apparently widely different embodiments of this invention may be made without departing from the spirit and scope thereof, it is to be understood that the applicants do not limit themselves to the specific proportions or embodiments thereof except as defined in the following claims.

We claim:

1. The process of sulphating aliphatic oxy compounds which comprises treating an aliphatic oxy compound with a sulphating agent, while dissolved in a solvent comprising liquid sulphur dioxide and another low-boiling inert liquid which will form a single phase reaction mixture.

2. The process of sulphating aliphatic hydroxy compounds which comprises treating an aliphatic hydroxy compound with a sulphating agent, while dissolved in a solvent comprising liquid sulphur dioxide and another low-boiling inert liquid which will form a single phase reaction mixture.

3. The process of sulphating aliphatic polyhydroxy compounds which comprises treating an aliphatic polyhydroxy compound with a sulphating agent, while dissolved in a solvent comprising liquid sulphur dioxide and another low-boiling inert liquid which will form a single phase reaction mixture.

4. The process of sulphating an inner anhydride of an aliphatic polyhydroxy compound which comprises treating an inner anhydride of an aliphatic polyhydroxy compound with a sulphating agent, while dissolved in a solvent comprising liquid sulphur dioxide and another low-boiling inert liquid which will form a single phase reaction mixture.

5. The process of sulphating aliphatic cyclic inner ethers which comprises treating an aliphatic saturated cyclic inner ether with a sulphating agent, while dissolved in a solvent comprising liquid sulphur dioxide and another low-boiling inert liquid which will form a single phase reaction mixture.

6. The process of sulphating an aliphatic oxirane compound which comprises treating an aliphatic oxirane compound with a sulphating agent, while dissolved in a solvent comprising liquid sulphur dioxide and another low-boiling inert liquid which will form a single phase reaction mixture.

7. The process of sulphating an aliphatic alcohol which comprises treating an aliphatic alcohol with a sulphating agent, while dissolved in a solvent comprising liquid sulphur dioxide and another low-boiling inert liquid which will form a single phase reaction mixture.

8. The process of sulphating a primary aliphatic alcohol which comprises treating a primary aliphatic alcohol with a sulphating agent, while dissolved in a solvent comprising liquid sulphur dioxide and another low-boiling inert liquid which will form a single phase reaction mixture.

9. The process of sulphating a polyhydric alcohol partial fatty acid ester which comprises treating a polyhydric alcohol partial fatty acid ester with a sulphating agent, while dissolved in a solvent comprising liquid sulphur dioxide and another low-boiling inert liquid which will form a single phase reaction mixture.

10. The process of sulphating aliphatic oxy compounds which comprises treating an aliphatic oxy compound having at least six carbon atoms with a sulphuric acid, while dissolved in a solvent comprising liquid sulphur dioxide and at least one other low-boiling inert liquid which will form a single phase reaction mixture.

11. The process of sulphating aliphatic hydroxy compounds which comprises treating an aliphatic hydroxy compound having at least six carbon atoms with a sulphating agent, while dissolved in a solvent comprising liquid sulphur dioxide and another low-boiling inert liquid which will form a single phase reaction mixture.

12. The process of sulphating aliphatic polyhydroxy compounds which comprises treating an aliphatic polyhydroxy compound having at least six carbon atoms with a sulphating agent, while dissolved in a solvent comprising liquid sulphur dioxide and another low-boiling inert liquid which will form a single phase reaction mixture.

13. The process of sulphating an aliphatic oxirane compound which comprises treating an aliphatic oxirane compound having at least six carbon atoms with a sulphating agent, while dissolved in a solvent comprising liquid sulphur dioxide and another low-boiling inert liquid which will form a single phase reaction mixture.

14. The process of sulphating a primary aliphatic alcohol which comprises treating a primary aliphatic alcohol having at least six carbon atoms with a sulphating agent, while dissolved in a solvent comprising liquid sulphur dioxide and petroleum ether.

15. The process of sulphating an aliphatic oxirane compound which comprises treating an aliphatic oxirane compound having at least six carbon atoms with a sulphating agent, while dissolved in a solvent comprising liquid sulphur dioxide and dioxane.

16. The process of sulphating an aliphatic oxirane compound which comprises treating an aliphatic oxirane compound having at least six carbon atoms with a short-chain alkyl sulphuric acid ester, while dissolved in a solvent comprising liquid sulphur dioxide and another low-boiling inert liquid which will form a single phase reaction mixture.

17. The process of sulphating an aliphatic oxirane compound which comprises treating an aliphatic oxirane compound having at least six carbon atoms with glycerol trisulphuric acid, while dissolved in a solvent comprising liquid sulphur dioxide and another low-boiling inert liquid which will form a single phase reaction mixture.

18. The process of preparing aliphatic sulphates which comprises treating with a sulphating agent the alcohols obtained from coconut oil by hydrogenation, while dissolved in a solvent comprising liquid sulphur dioxide and another low-boiling inert liquid which will form a single phase reaction mixture.

19. The process of preparing aliphatic sulphates which comprises treating cetyl alcohol with a sulphating agent, while dissolved in liquid sulphur dioxide and another low-boiling inert liquid which will form a single phase reaction mixture.

20. A water-soluble aliphatic sulphate prepared by reacting a 1,2 aliphatic oxirane compound having at least 6 carbon atoms with a sulphating agent.

21. The process of reacting a 1,2 aliphatic oxirane compound having at least 6 carbon atoms with a sulphating agent.

ROBERT LOUIS BRANDT.
JOHN ROSS.